United States Patent
Schwartz et al.

(10) Patent No.: US 7,230,686 B1
(45) Date of Patent: Jun. 12, 2007

(54) FOUR-MODE STABILIZED SOLID-STATE GYROLASER WITHOUT BLIND REGION

(75) Inventors: Sylvain Schwartz, Paris (FR); Gilles Feugnet, Les Ulis (FR); Jean-Paul Pocholle, La Norville (FR)

(73) Assignee: Thales, Neuilly-sur-Seine (FR)

( * ) Notice: Subject to any disclaimer, the term of this patent is extended or adjusted under 35 U.S.C. 154(b) by 276 days.

(21) Appl. No.: 10/526,611

(22) Filed: Mar. 16, 2005

(30) Foreign Application Priority Data

Mar. 16, 2004 (FR) .................................. 04 02706

(51) Int. Cl.
- *G01P 3/36* (2006.01)
- *G01C 19/64* (2006.01)
- *H01S 3/083* (2006.01)

(52) U.S. Cl. .................. 356/28.5; 356/28; 356/459; 372/94

(58) Field of Classification Search ................. 356/28, 356/28.5, 459, 472; 372/92–109
See application file for complete search history.

(56) References Cited

U.S. PATENT DOCUMENTS

| | | | |
|---|---|---|---|
| 3,647,303 A | | 3/1972 | Kramer, Jr. |
| 3,854,819 A | * | 12/1974 | Andringa ..................... 356/467 |
| 3,862,803 A | * | 1/1975 | Yntema et al. ............. 356/467 |
| 4,222,668 A | | 9/1980 | Henry |
| 4,431,308 A | * | 2/1984 | Mitsuhashi et al. ......... 356/459 |
| 4,433,915 A | | 2/1984 | Hanse |
| 4,521,110 A | * | 6/1985 | Roberts et al. ............. 356/459 |
| 5,331,403 A | * | 7/1994 | Rosker et al. .............. 356/459 |
| 6,034,770 A | * | 3/2000 | Kim et al. .................. 356/459 |
| 6,430,206 B1 | | 8/2002 | Debuisschert et al. |
| 6,631,002 B1 | * | 10/2003 | Numai ........................ 356/461 |
| 2004/0202222 A1 | | 10/2004 | Pocholle et al. |

FOREIGN PATENT DOCUMENTS

FR     2 465 199     8/1980

* cited by examiner

*Primary Examiner*—Thomas H. Tarcza
*Assistant Examiner*—Isam Alsomiri
(74) *Attorney, Agent, or Firm*—Oblon, Spivak, McClelland, Maier & Neustadt, P.C.

(57) ABSTRACT

The invention concerns solid-state gyrolasers used to measure rotation speeds or relative angular positions. This type of equipment is used, in particular, in aeronautical applications.

The purpose of the invention is to complete the optic devices required to control the instability of ring-shaped solid-state lasers using specific optic devices that eliminate the blind region without adding a measurement bias. In this way, a "fully optic" solid-state laser is obtained, without moving parts, stable, and without blind region.

These devices comprise in particular polarization separation optical devices, reciprocal and nonreciprocal optical rotators arranged so that four linearly polarized optical modes travel in the cavity at sufficiently different frequencies to avoid mode locking.

14 Claims, 5 Drawing Sheets

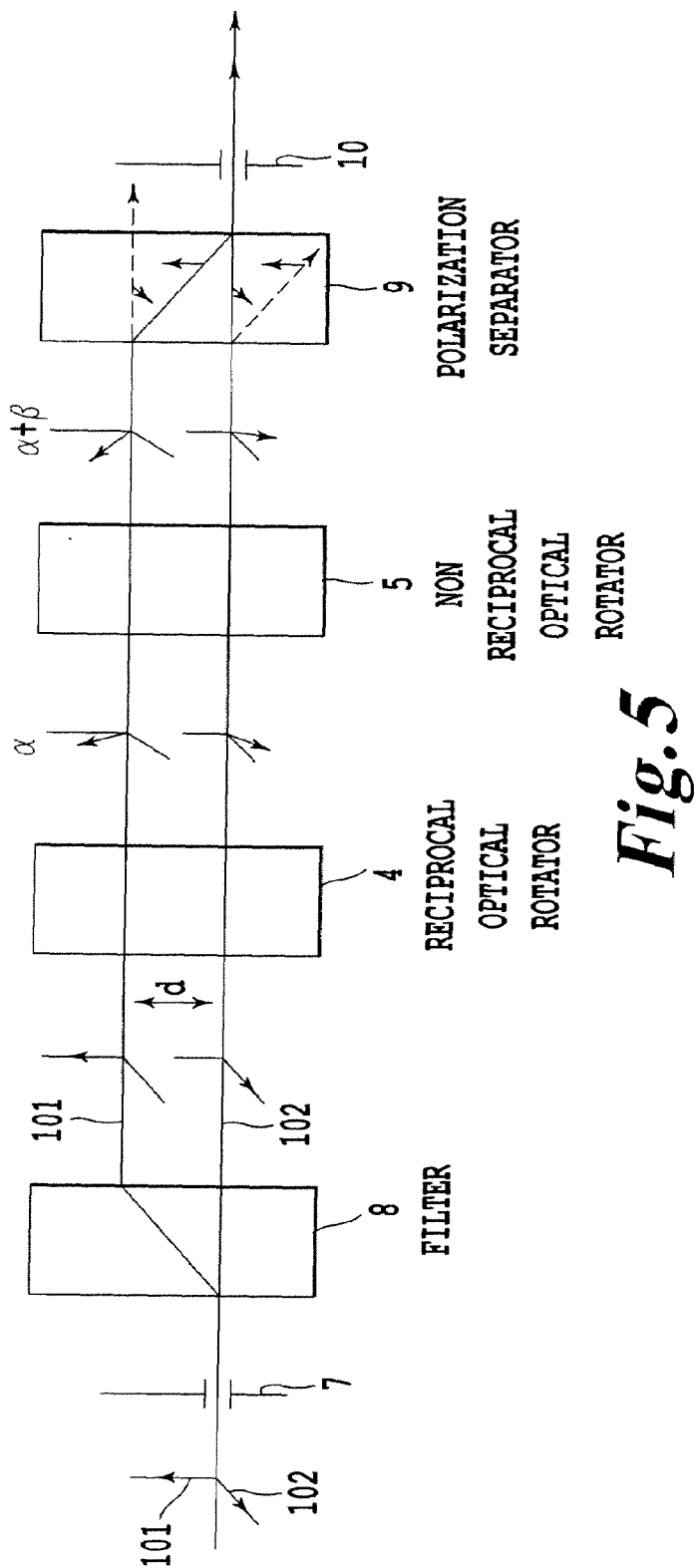

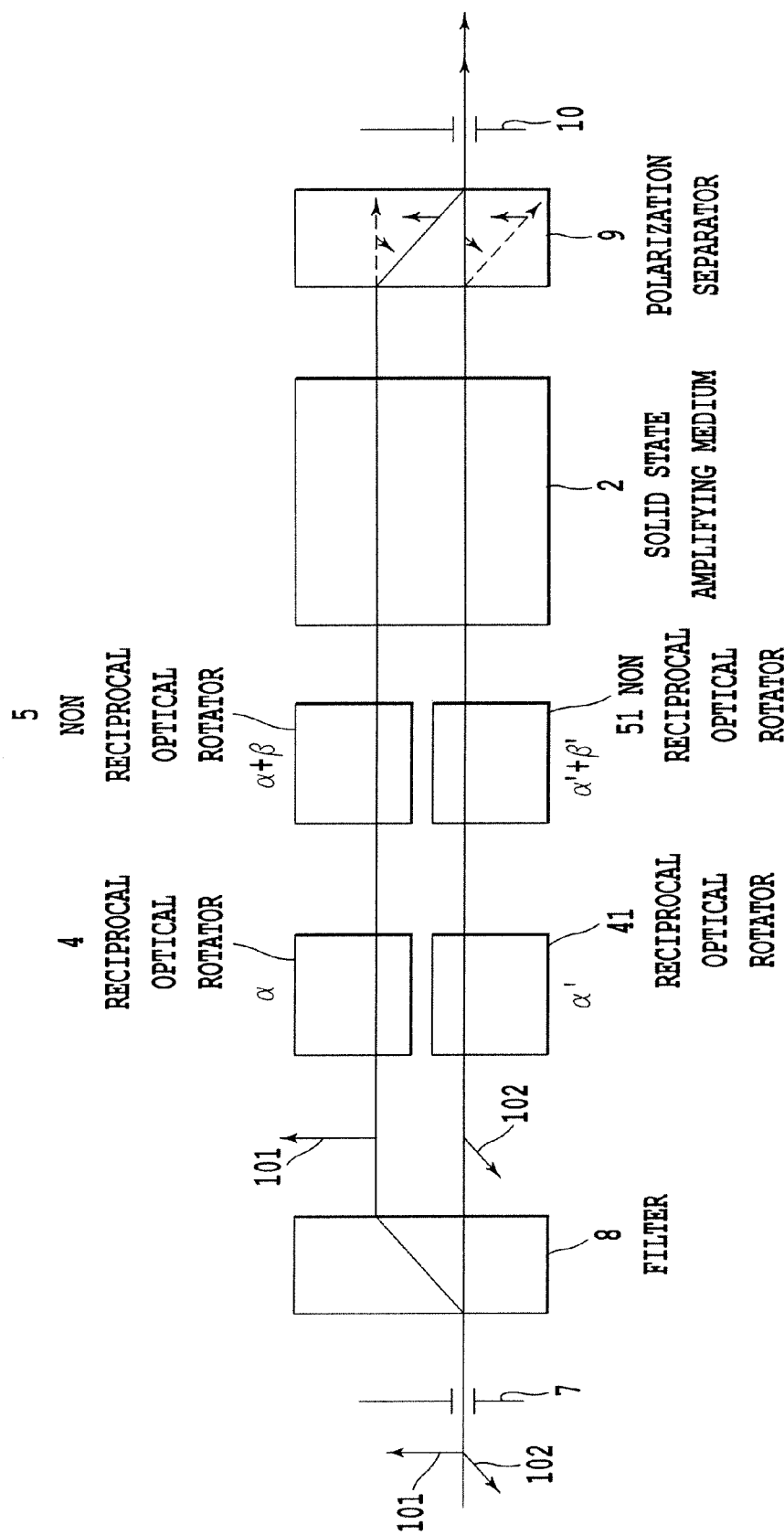

FOUR-MODE STABILIZED SOLID-STATE GYROLASER WITHOUT BLIND REGION

BACKGROUND OF THE INVENTION

1. Field of the Invention

The invention concerns solid-state gyrolasers used to measure rotation speeds or angular positions. This type of equipment is used, in particular, in aeronautical applications.

Gyrolasers were developed some thirty years ago and are widely sold and used today. Their operation is based on the Sagnac effect, which induces a difference in frequency $\Omega$ between two optical emission modes propagated in opposite directions, called counter-propagating, from a rotating bidirectional ring-shaped laser cavity. Typically, difference in frequency $\Omega$ is:

$$\Omega = 4 A \bar{\omega}/\lambda L$$

where L and A are respectively the cavity length and area; $\lambda$ is the laser emission average wavelength excluding the Sagnac effect; $\bar{\omega}$ is the gyrolaser angular rotation speed.

The value of $\Omega$ obtained through spectral analysis of the beat of the two emitted beams serves to obtain the value of $\bar{\omega}$ very accurately. Electronically counting the beat fringes advancing during a change in angular position gives the relative value of the angular position also extremely accurately.

2. Description of the Prior Art

Manufacturing a gyrolaser requires overcoming a few technical difficulties. The first is linked to the quality of the beat between the two beams, which determines the laser's correct operation. Proper stability and a relative similarity in the intensities emitted in both directions are required for the beat to be correct. But in the case of solid-state lasers, the stability and similarity are not guaranteed due to mode—mode competition, which makes one of the two counter-propagating modes monopolize the available gain, to the detriment of the other mode. The problem of bidirectional emission instability for a solid-state ring-shaped laser may be solved by implementing a counter-reaction loop intended to slave around a set value the difference between the intensities of the two counter-propagating modes. This loop acts on the laser, either by linking its losses to the propagation direction, for instance by means of a reciprocal rotating element, a nonreciprocal rotating element and a polarizing element (patent application No. 03 03645), or by linking its gain to the propagation direction, for instance by means of a reciprocal rotating element, a nonreciprocal rotating element and a polarized emission crystal (patent application No. 03 14598). Once slaved, the laser emits two counter-propagating beams with stable intensities and can be used as a gyrolaser.

A second technical difficulty is linked to low rotation speeds, since gyrolasers only work correctly beyond a given rotation speed. At low rotation speeds, the Sagnac beat signal disappears due to the coupling, also known as locking, of the two counter-propagating modes because of the backscattering of the light of the various optical elements present in the cavity. The rotation speed range in which this phenomenon is observed is usually called blind region and corresponds to a minimum beat frequency of a few tens of kilohertz. This problem is not intrinsic to the solid state: it is also encountered with gas gyrolasers. The most common solution for this second type of gyrolasers is to activate the device mechanically by giving it a forced and known movement that artificially places it outside the blind region as often as possible.

SUMMARY OF THE INVENTION

The purpose of the invention is to complete the optic devices required to control the instability of solid-state lasers, using specific optic devices that eliminate the blind region without adding a measurement bias. In this way, a "fully optic" solid-state laser is obtained, without moving parts, stable, and without blind regions.

More precisely, the invention concerns a gyrolaser comprising at least:
- a ring-shaped optical cavity;
- a solid-state amplifier medium;
- a slaving device comprising a first optical assembly made up of a first nonreciprocal optical rotator and an optical element, this element being either a reciprocal optical rotator or a birefringent element, with at least one of the effects or the birefringence being adjustable;
- and a measuring instrument;

characterized by the fact that the said cavity also comprises:
- a second optical assembly made up of a first spatial filtering device and a first polarization separation optical element;
- a third optical assembly made up of a second spatial filtering device and a second polarization separation optical element, the second and third optical assemblies being located at either side of the first optical assembly, each symmetrical to the other;
- a fourth optical assembly made up successively of a first quarter waveplate, a second nonreciprocal optical rotator and a second quarter waveplate, whose main axes are perpendicular to those of the first quarter waveplate;

such that a first linearly polarized propagation mode and a second propagation mode polarized linearly perpendicular to the first, can be established in the cavity in a first direction, and a third propagation mode polarized linearly parallel to the first propagation mode and propagating in the opposite direction, and a fourth propagation mode polarized linearly parallel to the second mode and propagating in the opposite direction, can be established in the cavity, with the main axes of the first quarter waveplate and the second quarter waveplate tilted 45 degrees relative to the linear polarization directions of the four propagation modes, and the optical frequencies of the four modes all being different.

Advantageously, the measuring system comprises:
- optical devices to make on the one hand the first propagation mode interfere with the third, and on the other, the second interfere with the fourth;
- opto-electronic devices to determine on the one hand, a first difference in optical frequency between the first propagation mode and the third, and on the other, a second difference in optical frequency between the second propagation mode and the fourth;
- electronic devices to obtain the difference between the above first difference in frequency and the above second difference in frequency. Usually the first frequency difference and the second frequency difference are greater than approximately one hundred kilohertz. The resulting frequency difference may be integrated in time by means of an electronic fringe-counting device in order to obtain the angular position.

Advantageously the cavity comprises a birefringent retardation plate.

In the preferred embodiment, the polarization separation first optical element and second optical element are birefringent retardation plates with flat, parallel sides, the birefringence axis being tilted 45 degrees relative to the plane of the sides.

Advantageously, the slaving device comprises at least a fifth optical assembly consisting of a third nonreciprocal optical rotator and a second optical element, which is either a birefringent element or a reciprocal optical rotator, whose birefringence or reciprocal effect are adjustable; the first and third propagation modes cross the first nonreciprocal optical rotator and the first optical element, the second and fourth propagation modes cross the third nonreciprocal optical rotator and the second optical element. The birefringent elements are in particular birefringent retardation plates such as quarter waveplates.

BRIEF DESCRIPTION OF THE DRAWINGS

The invention shall be better understood and other advantages revealed by reading the non-restrictive description below and the appended figures, among which:

FIG. 5 shows the operation of the first, second and third optical assembly in the direct propagation direction;

FIG. 6 shows the operation of the first, second and third optical assembly in the direct propagation direction in a variant of the embodiment;

MORE DETAILED DESCRIPTION

The specific devices according to the invention must fulfill three specific functions:
  a slave the intensity of the counter-propagating modes;
  eliminate the blind region;
  introduce no measurement bias.

To fulfill these functions, the device generates inside the cavity four optical modes linearly polarized at different frequencies. The first and second propagation modes propagate inside the cavity in a first direction, the second mode being linearly polarized perpendicular to the first mode outside the fourth optical assembly, and circularity inside the fourth optical assembly. The third and fourth modes propagate in the opposite direction, the third propagation mode being linearly polarized parallel to the first mode and the fourth propagation mode being linearly polarized parallel to the second mode outside the fourth optical assembly and circularity inside it.

Figure 1:
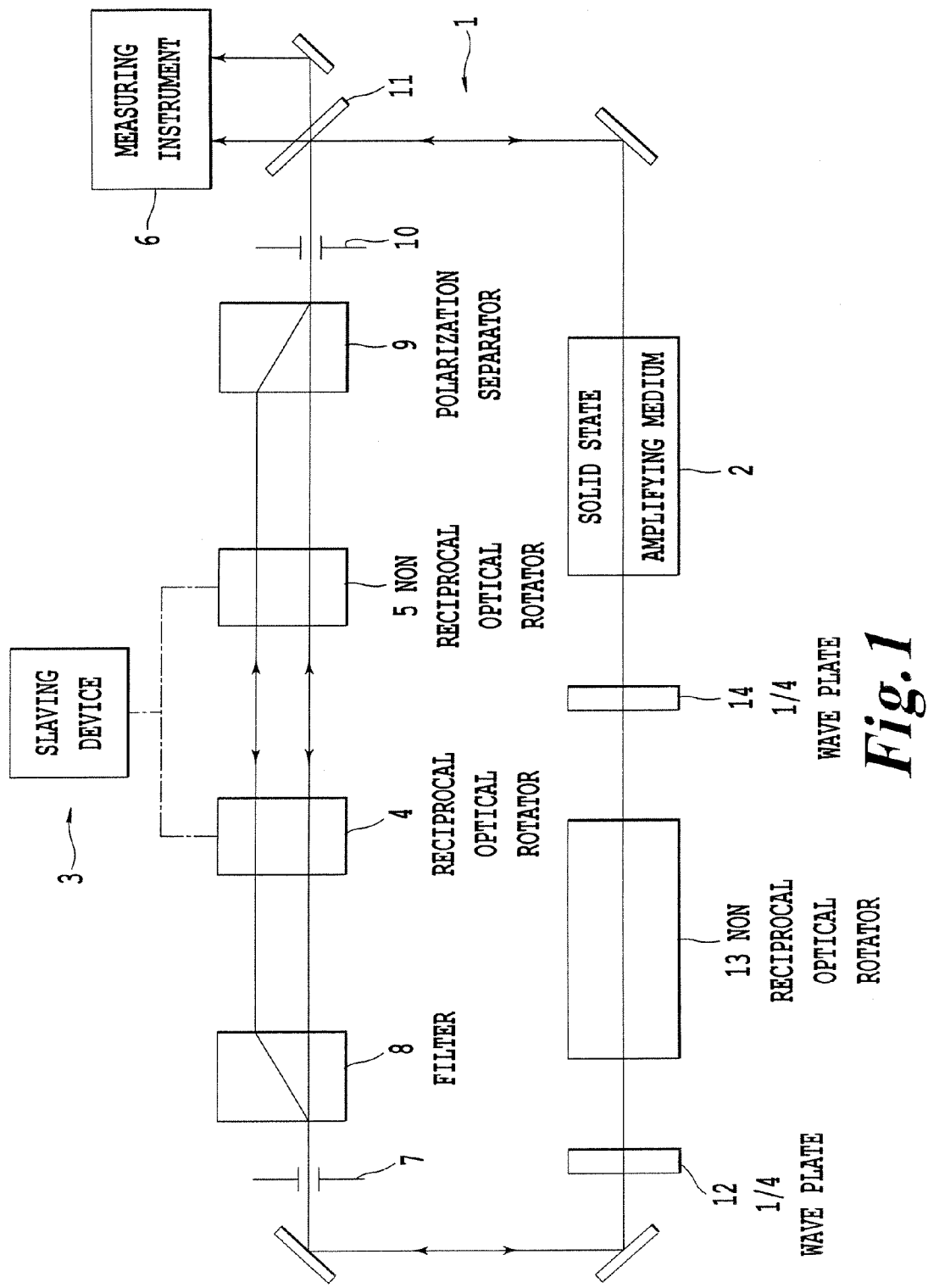
FIG. 1 is an overview of the gyrolaser according to the invention.

These four modes are generated and controlled according to the invention by means of the gyrolaser shown in FIG. 1, where the optical element is a reciprocal optical rotator. It mainly comprises:
  a ring-shaped optical cavity 1 comprising at least one partly-reflective mirror 11 to treat counter-propagating modes outside the cavity;
  a solid-state amplifying medium 2;
  a slaving device 3 controlling optical rotator(s) 4 and 5 (dotted arrows on the figure);
  a measuring instrument 6;
  an optical system, comprising:
    a first optical assembly made up of a first nonreciprocal optical rotator 5 and a reciprocal optical rotator 4;
    a second optical assembly made up of a first spatial filtering device 7 and a first polarization separation optical element 8;
    a third optical assembly made up of a second spatial filtering device 10 and of a second polarization separation optical element 9, the second and third optical assemblies being located at either side of the first optical assembly, each symmetrical to the other;
    a fourth Optical assembly made up successively of a first quarter waveplate 12, of a second nonreciprocal optical rotator 13 and a second quarter waveplate 14 whose main axes are rotated 90° relative to those of the first quarter waveplate.

Figure 3:
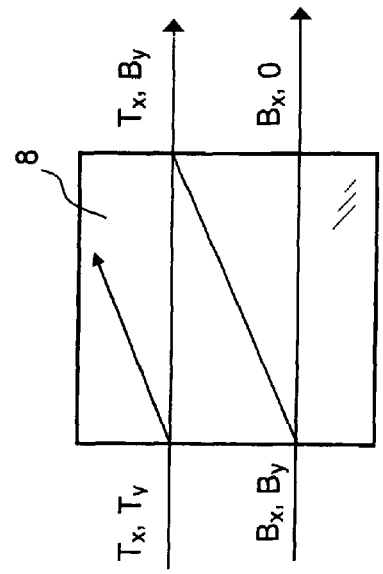
FIG. 3 shows the operating principle of a nonreciprocal optical rotator.

The optical system comprises a reciprocal optical rotator 4 and a nonreciprocal optical rotator 5. An optical rotation of a wave's polarization is said to be nonreciprocal when the effects of the polarization's rotation add up after the wave is reflected (goes and returns) in an optical component with this property. The optical component is called nonreciprocal optical rotator. For example, material with the Faraday effect is material that when subjected to a magnetic field rotates the polarization plane of beams passing through it. This effect is not reciprocal. Thus, the same beam traveling in the opposite direction will have its polarization plane rotated in the same direction. This principle is shown in FIG. 3. The polarization direction of the linearly polarized beam 101 is rotated by an angle β when it passes through component 5 with Faraday effect in the direct sense (top diagram of FIG. 3). If we reinject in the component with Faraday effect an identical beam 103 propagating in the opposite direction and whose polarization direction is initially rotated by β, its polarization direction rotates again by β in passing through the component, the total rotation angle being 2β after a reflection (lower diagram of FIG. 3).

Figure 2:
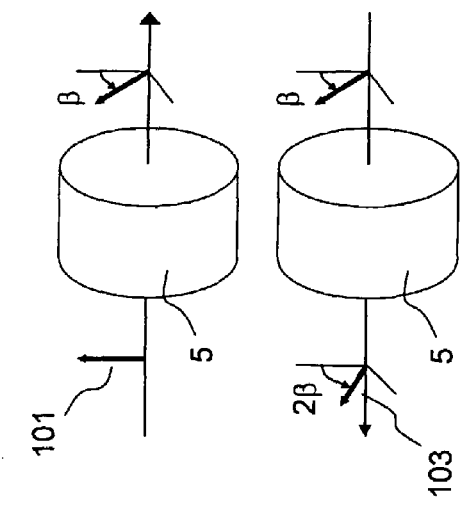
FIG. 2 shows the operating principle of a reciprocal optical rotator.

In a traditional reciprocal rotator 4, the polarization direction rotates by +α in the direct sense and rotates by −α in the opposite propagation direction, so that the initial polarization direction is obtained, as shown on the diagrams in FIG. 2.

Figure 4B:
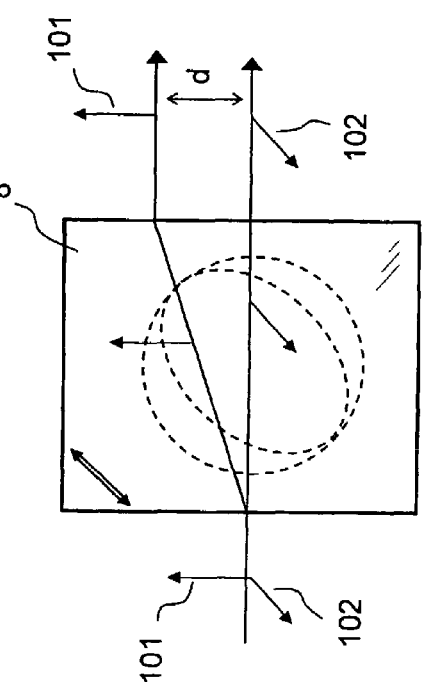
FIG. 4b shows the equivalent diagram of this retardation plate in the generalized Jones formalism.
Figure 4A:
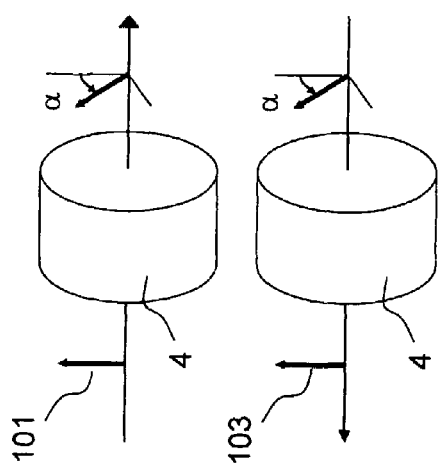
FIG. 4a shows the operating principle of a polarization separation birefringent retardation plate.

The optical system also comprises two polarization separation optical elements. There are many geometrical configurations that guarantee the separation of polarized beams. As an example, FIG. 4a shows a birefringent retardation plate 8 that separates polarized beams linearly. The retardation plate comprises two flat, parallel sides and cut from a uniaxial birefringent crystal characterized by an ordinary optical index and an extraordinary optical index.

The variation in the ordinary optical index within the retardation plate is spherical and the variation of the extraordinary optical index is ellipsoidal as shown by the dotted line in FIG. 4a. Depending on the preferred direction (optical axis) shown by the tilted double arrow on the figure, the ordinary and extraordinary optical indices are equal. The retardation plate is cut along a plane tilted 45 degrees from this direction. When a first linearly polarized light beam 101 hits the entrance side of the birefringent retardation plate at normal incidence, it is demonstrated that it passes through the retardation plate without changing direction. When a second light beam 102 linearly polarized perpendicular to beam 101 hits the entrance side of the birefringent retardation plate at normal incidence, it is demonstrated that it spatially offset when passing through the retardation plate. Thus when the two beams 101 and 102 exit the birefringent retardation plate, they are parallel to each other and separated by a distance d as shown on FIG. 4a, the distance d depending on the optical characteristics and the thickness of the retardation plate.

The optical system's operation is shown on FIG. 5. The figure shows the passage of a first propagation mode 101 and of a second propagation mode 102 linearly polarized through the first optical assembly. Before the first spatial filtering device 7, the linear polarization of the first mode 101 is on the plane of the sheet and the linear polarization of the second mode 102 is perpendicular to the plane of the sheet. These polarization directions are shown by straight arrows. Obviously, the first spatial filtering preserves these polarization directions.

The first propagation mode with intensity $I_1$ passes through the first polarization separation optical element 8, exits parallel to its direction of incidence offset by d as shown. Next it passes through the reciprocal rotator 4 and then the first nonreciprocal rotator 5. Consequently, its polarization direction is rotated by an angle $\alpha$ after passing through the first element, and by an angle equal to $\alpha+\beta$ after passing through the second element. At the exit of the first rotator, the linear polarization of the first mode can be resolved into two orthogonal components, the first parallel to the initial direction and with an intensity equal to the value of the initial intensity $I_1$ multiplied by the factor $\cos^2(\alpha+\beta)$, the second perpendicular to the initial direction and with an intensity equal to the value of the initial intensity $I_1$ multiplied by the factor $\sin^2(\alpha+\beta)$. The first component passes through the second polarization separation optical element 9 and is offset by $-d$, this second optical element being positioned symmetrically to the first and consequently this component passes through the second filtering 10 without damping, the second filtering being positioned on the same axis as the first filtering. The second component passes through the second polarization separation optical element with no offset (dotted arrow on FIG. 5) and consequently cannot passer through the second filtering.

At the end, the first mode has therefore been damped by a factor $\cos^2(\alpha+\beta)$. Similarly, it is shown that the second propagation mode 102 is also damped by the same factor. The third and fourth propagation modes traveling in the opposite direction are also damped by a common factor. It can be easily proved that this second factor is $\cos^2(\alpha-\beta)$. It must be noted that the beams lost in the beam separation element may eventually be sent onto photo-detectors of the slaving system in order to provide beam intensity data.

It must also be noted that a reciprocal phase difference often appears between the two polarization states in this type of device. This phase difference is useful because it corresponds to a bias that can avoid frequency-locking but its value is not necessarily sufficiently high. If necessary, an additional phase difference is induced by means of a birefringent element inserted in the cavity.

The modes are therefore damped differently according to their propagation direction and the damping depends directly on the importance of the effects the polarization of the two modes has experienced. Thus it is possible to vary the intensities of the counter-propagating modes by varying at least one of the two values $\alpha$ or $\beta$ by the effects experienced by the polarizations of two modes through the slaving device. Thus the intensity of the various modes is slaved around a constant value.

In this configuration, the first and second propagation modes on the one hand and the third and fourth propagation modes on the other, are damped in the same way. Different damping values can be obtained on modes propagating in the same direction by using two independent retroaction loops each affecting a different polarization. The principle is shown on FIG. 6. Between the second and the third optical assemblies, each consisting of a spatial filtering and a polarization separation optical element, two optical assemblies is inserted, each consisting of a nonreciprocal optical rotator 5 or 51 and a reciprocal optical rotator 4 or 41; these two ensembles being controlled independently by the slaving device not shown on FIG. 6. Of course, the separation distance d between the two polarized beams must be sufficient to allow the various rotators to be set up. The amplifying medium 2 could be placed, in this configuration, on the separation path of the beams as shown on FIG. 6. The optical pumping then takes place at two different points, diaphragm 10 guaranteeing the spatial superposition of the beams outside the separation device. This variant of the invention has the added advantage of fully uncoupling the four modes as regards the gain, thus eliminating the effects of competition between modes.

Figure 7:
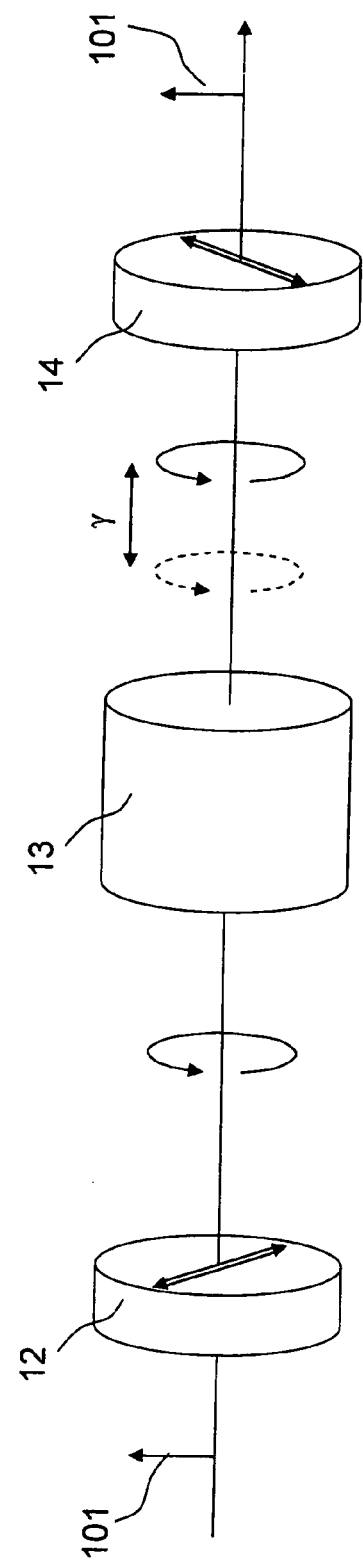
FIG. 7 shows the operation of the fourth optical assembly for the first and second propagation modes.

The operation of the fourth optical assembly is shown on FIG. 7. When a linearly polarized optical mode 101 (right arrow on FIG. 7) passes through the first quarter waveplate 12, if the main axis of this retardation plate, represented by a double arrow, is tilted 45 degrees relative to the polarization direction, then the mode polarization exits with a right circular polarization (full semi-circular arrow on FIG. 7).

This circular polarized wave is subjected to a nonreciprocal phase difference $\gamma$ when it passes through the second optical nonreciprocal rotator 13. It is then transformed again into a linearly polarized wave by the second quarter waveplate 14 whose main axis is perpendicular to the main axis of the first quarter waveplate. Thus a nonreciprocal phase difference is introduced in the mode passing through this fourth optical assembly, while preserving the wave's linear polarization. Naturally, if the wave is polarized linearly and perpendicular to the direction of 101, it is transformed into a left circular polarized wave and subjected to a nonreciprocal phase difference $-\gamma$.

Using the above devices, it is therefore possible to generate inside the cavity four modes traveling two by two in opposite directions, to attenuate them variably in a controlled manner to keep them at the same level of intensity and also to introduce reciprocal and nonreciprocal phase differences on these modes. To determine the natural modes and their frequencies, the Jones matrices formalism is used. In the general case, this consists in representing the influence of a component on an optical propagation mode via a 2×2 matrix referenced to a plane perpendicular to the propagation direction of the optical modes. In this case, we use a generalized Jones formalism, adapted to the case where two propagation paths are possible in the cavity, as was seen before. The paths are called upper or "top" path and lower or "bottom" path. In this case, the representative matrices are 4×4 matrices. In an orthonormalized reference (x, y) whose axes are on a plane perpendicular to the propagation direction of the optical beams, the electrical field of the optical mode is described by a vector with four components $(T_x, T_y, B_x, B_y)$, where $(T_x, T_y)$ is the Jones vector of the electrical field along the top path and $(B_x, B_y)$ the Jones vector of the electrical field along the bottom path as shown on FIG. 4b where the optical paths are represented inside a single-axis birefringent retardation plate cut 45° relative to its optical axis 8.

To obtain the resulting influence of all intra-cavity components, we merely determine the natural states of the product of the various matrices representative of these components. This product is not necessarily commutative, so the matrix may change according to the beam propagation direction.

In this formalism, the first polarization separation optical element made up of a birefringent crystal cut 45 degrees relative to its optical axis is seen, when it is crossed in the proper propagation direction, as a component with two entrances and two exits, "top" and "bottom":

that sends $B_x$ and $T_x$, which propagate parallel to the ordinary axis on themselves, and that "raises" $B_y$ and $T_y$, which propagate parallel to the extraordinary axis, by sending them respectively on $T_y$ and 0. The component $T_y$ is either stopped by the sides of the crystal or unaligned with the cavity's propagation axes and cannot oscillate.

When it is crossed in the opposite direction, the crystal naturally "lowers" $B_y$ and $T_y$, while $B_x$ and $T_x$ remain unchanged.

The total cavity birefringence introduces a phase difference of $\phi/2$ between the two polarization states. The Jones matrix of the first or the second polarization separation optical element is therefore expressed according to the propagation direction in which the optical beams rise:

$$c_\uparrow(\phi) = \begin{pmatrix} e^{-i\phi/4} & 0 & 0 & 0 \\ 0 & 0 & 0 & e^{i\phi/4} \\ 0 & 0 & e^{-i\phi/4} & 0 \\ 0 & 0 & 0 & 0 \end{pmatrix}$$

When it is crossed in the opposite propagation direction, the first (or the second) polarization separation optical element lowers the optical beams. The matrix is therefore:

$$c_\downarrow(\phi) = \begin{pmatrix} e^{-i\phi/4} & 0 & 0 & 0 \\ 0 & 0 & 0 & 0 \\ 0 & 0 & e^{-i\phi/4} & 0 \\ 0 & e^{i\phi/4} & 0 & 0 \end{pmatrix}$$

The spatial filtering devices matrix is:

$$D = \begin{pmatrix} 0 & 0 & 0 & 0 \\ 0 & 0 & 0 & 0 \\ 0 & 0 & 1 & 0 \\ 0 & 0 & 0 & 1 \end{pmatrix}$$

An element which induces no transverse effect and whose 2×2 Jones matrix is matrix m will have the following matrix in 4×4 formalism:

$$M = \begin{pmatrix} m & 0 & 0 \\ & 0 & 0 \\ 0 & 0 & m \\ 0 & 0 & \end{pmatrix}$$

Thus the matrices of the other elements present in the device can be written as follows:

For a reciprocal rotator crossed in a rotation direction called direct sense, the matrix $R_+(\alpha)$ is:

$$R_+(\alpha) = \begin{pmatrix} \cos(\alpha) & -\sin(\alpha) & 0 & 0 \\ \sin(\alpha) & \cos(\alpha) & 0 & 0 \\ 0 & 0 & \cos(\alpha) & -\sin(\alpha) \\ 0 & 0 & \sin(\alpha) & \cos(\alpha) \end{pmatrix}$$

For a reciprocal rotator crossed in the opposite rotation direction called opposite sense, the matrix $R_-(\alpha)$ is:

$$R_-(\alpha) = \begin{pmatrix} \cos(\alpha) & \sin(\alpha) & 0 & 0 \\ -\sin(\alpha) & \cos(\alpha) & 0 & 0 \\ 0 & 0 & \cos(\alpha) & \sin(\alpha) \\ 0 & 0 & -\sin(\alpha) & \cos(\alpha) \end{pmatrix}$$

For a nonreciprocal rotator, the matrix is independent of the propagation direction and is:

$$F(\beta) = \begin{pmatrix} \cos(\beta) & -\sin(\beta) & 0 & 0 \\ \sin(\beta) & \cos(\beta) & 0 & 0 \\ 0 & 0 & \cos(\beta) & -\sin(\beta) \\ 0 & 0 & \sin(\beta) & \cos(\beta) \end{pmatrix}$$

For a quarter waveplate rotated 45 degrees, the matrix is:

$$L_1 = \frac{1}{\sqrt{2}} \begin{pmatrix} 1 & -i & 0 & 0 \\ -i & 1 & 0 & 0 \\ 0 & 0 & 1 & -i \\ 0 & 0 & -i & 1 \end{pmatrix}$$

For a quarter waveplate rotated 135 degrees, the matrix is:

$$L_2 = \frac{1}{\sqrt{2}} \begin{pmatrix} 1 & i & 0 & 0 \\ i & 1 & 0 & 0 \\ 0 & 0 & 1 & i \\ 0 & 0 & i & 1 \end{pmatrix}$$

Matrices $J_+$ and $J_-$ representative of all optical devices present in the cavity for modes propagating in the direct sense and in the opposite direction can be obtained by simple multiplication:

$J_+ =$ $$L_2.F(\gamma).L_1.D.C_\downarrow(\phi).F(\beta).R_+(\alpha).C_\uparrow(\phi).D = \begin{pmatrix} 0 & 0 & 0 & 0 \\ 0 & 0 & 0 & 0 \\ 0 & 0 & \cos(\alpha+\beta)e^{-i(\phi/2-\gamma)} & 0 \\ 0 & 0 & 0 & \cos(\alpha+\beta)e^{i(\phi/2-\gamma)} \end{pmatrix}$$

and $J_- =$ $$L_1.F(\gamma).L_2.D.C_\downarrow(\phi).F(\beta).R_-(\alpha).C_\uparrow(\phi).D = \begin{pmatrix} 0 & 0 & 0 & 0 \\ 0 & 0 & 0 & 0 \\ 0 & 0 & \cos(\alpha-\beta)e^{-i(\phi/2+\gamma)} & 0 \\ 0 & 0 & 0 & \cos(\alpha-\beta)e^{i(\phi/2+\gamma)} \end{pmatrix}$$

Knowing matrices $J_+$ and $J_-$ helps determine the natural states of the optical modes that may propagate in the cavity. There are two different natural states along axes x and y in each propagation direction, i.e. a total of four natural states, as follows:

(+,x): Natural state for horizontal linear polarization propagating in a first propagation direction;

(+,y): Natural state for vertical linear polarization propagating in the first propagation direction;

(−,x): Natural state for horizontal linear polarization propagating in the opposite propagation direction;

(−,y): Natural state for vertical linear polarization propagating in the opposite propagation direction.

The modulus of natural states (+,x) and (+,y) equals $\cos(\alpha+\beta)$ whereas the modulus of natural states (−,x) and (−,y) equals $\cos(\alpha-\beta)$. The modulus differs with the propagation direction, so it is possible to slave the counter-propagating modes at a constant difference of intensity by varying one of the two coefficients α or β.

If the gyrolaser does not rotate, the frequency ν of an optical mode in a ring-shaped laser cavity with length L is typically linked to the phase difference φ which this mode undergoes after each turn round the cavity:

$$v = \frac{c}{L}\left(n - \frac{\varphi}{2\pi}\right)$$

where n is an integer

For a given value of n, the frequencies of the various natural modes are therefore:

For mode $$(+,x), v(+,x) = \frac{c}{L}\left(n + \frac{\phi/2-\gamma}{2\pi}\right)$$

For mode $$(+,y), v(+,y) = \frac{c}{L}\left(n - \frac{\phi/2-\gamma}{2\pi}\right)$$

For mode $$(-,x), v(-,x) = \frac{c}{L}\left(n + \frac{\phi/2+\gamma}{2\pi}\right)$$

For mode $$(-,y), v(-,y) = \frac{c}{L}\left(n - \frac{\phi/2+\gamma}{2\pi}\right)$$

When the cavity is rotating, the natural frequencies are offset by the Sagnac effect by a frequency of ±Ω/2, the sign depending on the mode propagation direction. The modes' frequencies are in this case:

For mode $$(+,x), v(+,x) = \frac{c}{L}\left(n + \frac{\phi/2-\gamma}{2\pi}\right) + \frac{\Omega}{2}$$

For mode $$(+,y), v(+,y) = \frac{c}{L}\left(n - \frac{\phi/2-\gamma}{2\pi}\right) + \frac{\Omega}{2}$$

For mode $$(-,x), v(-,x) = \frac{c}{L}\left(n + \frac{\phi/2+\gamma}{2\pi}\right) - \frac{\Omega}{2}$$

For mode $$(-,y), v(-,y) = \frac{c}{L}\left(n - \frac{\phi/2+\gamma}{2\pi}\right) - \frac{\Omega}{2}$$

Strictly speaking, if the frequencies of the optical modes are to be determined very accurately, the variations of cavity length due to birefringence and the Sagnac effect should be taken into account. It can be shown that these effects are negligible and do not affect the measurement's accuracy.

To avoid coupling between modes and the appearance of a blind region, a sufficient frequency separation must be guaranteed. Consequently, the terms $(c/2\pi L)\gamma$ and $(c/2\pi L)(\phi-2\gamma)$ must both be greater than a set minimum value, determined by the operating range desired for the gyrolaser. To guarantee this condition, simply dimension appropriately the optical and geometrical parameters of the reciprocal and nonreciprocal rotators.

The beat of beams (+,x) and (−,x) on the one hand, and (+,y) and (−,y) on the other hand, produces two beat frequencies $v_1$ and $v_2$ such that:

$$v_1 = \left|v(-,x) - v(+,x) = \frac{c}{L}\frac{\gamma}{\pi} - \Omega\right| \text{ and } v_2 = \left|v(-,y) - v(+,y) = \frac{c}{L}\frac{\gamma}{\pi} + \Omega\right|$$

The difference between these two frequencies $\Delta v$ is:

$$\Delta v = v_1 - v_2 = 2\Omega$$

Thus by measuring $\Delta v$, the beat frequency $\Omega$ is obtained to determine the angular rotation speed. This value is independent of the cavity bias values and any fluctuations in them.

The different operations to determine the frequency difference $\Delta v$ are performed with the measuring instrument, which comprises optical devices to make on the one hand the first propagation mode (+,x) interfere with the third propagation mode (−, x) and on the other hand the second propagation mode (+,y) with the fourth propagation mode (−,y); a variant is possible by making on the one hand (+,x) interfere with (−,y), and on the other hand (+,y) with (−,x);

opto-electronic devices to determine on the one hand, a first difference in optical frequency $v_1$ between the first propagation mode and the third propagation mode, and on the other hand, the second difference in frequency between the second propagation mode and the fourth propagation mode $v_2$;

electronic devices to obtain the frequency difference $\Delta v$ between the first frequency difference and the second frequency difference $v_2$.

It may be useful to introduce an optical standard type Fabry-Perot in the cavity. Naturally, it must not be too fine to avoid coupling the frequency of the various modes too strongly. It may be advantageous to tilt the sides of the standard relative to the beam propagation direction so as to avoid the propagation of vitreous reflections.

It is of course possible to assemble several gyrolasers according to the invention to create an angular speed measurement system along three different axes, comprising, for instance, three gyrolasers mounted on a common mechanical structure.

What is claimed is:

1. Gyrolaser to measure the angular speed or the relative angular position according to a set rotation axis, comprising at least:
    a ring-shaped optical cavity;
    a solid-state amplifying medium;
    a slaving device including at least a first optical assembly made up of a first nonreciprocal optical rotator and an optical element, said optical element being either a reciprocal optical rotator or a birefringent element, with at least one of the effects or the birefringence being adjustable;
    a measuring instrument;
    a second optical assembly made up of a first spatial filtering device and of a first polarization separation optical element;
    a third optical assembly made up of a second spatial filtering device and of a second polarization separation optical element, the second and third optical assemblies being located at either side of the first optical assembly, each symmetrical to the other;
    a fourth optical assembly made up successively of a first quarter waveplate, a second nonreciprocal optical rotator and a second quarter waveplate whose main axes are perpendicular to those of the first quarter waveplate;
    such that a first linearly polarized propagation mode and a second propagation mode polarized linearly perpendicular to the first, can propagate in a first direction in the cavity, and a third propagation mode polarized linearly parallel to the first mode and a fourth propagation mode polarized linearly parallel to the second mode can propagate in the opposite direction in the cavity, with the main axes of the first quarter waveplate and the second quarter waveplate tilted 45 degree relative to the linear polarization directions of the four propagation modes, and the optical frequencies of the four modes all being different.

2. Gyrolaser according to claim 1, wherein the cavity comprises a birefringent retardation plate, which helps induce or increase a frequency difference between the orthogonal polarization states.

3. System to measure the angular speeds or relative angular positions along three different axes, comprising three gyrolasers according to claim 2, oriented in different directions and mounted on a common mechanical structure.

4. Gyrolaser according to claim 1, wherein the measuring instrument comprises:
    optical devices to make on the one hand the first propagation mode interfere with the third, and on the other, the second interfere with the fourth;
    opto-electronic devices to determine on the one hand, a first optical frequency difference between the first propagation mode and the third, and on the other, a second frequency difference between the second propagation mode and the fourth;
    electronic devices to obtain the frequency difference between the above first frequency difference and the above second frequency difference.

5. Gyrolaser according to claim 4, wherein the first frequency difference and the second frequency difference are greater than approximately one hundred kilohertz.

6. System to measure the angular speeds or relative angular positions along three different axes, comprising three gyrolasers according to claim 5, oriented in different directions and mounted on a common mechanical structure.

7. System to measure the angular speeds or relative angular positions along three different axes, comprising three gyrolasers according to claim 4, oriented in different directions and mounted on a common mechanical structure.

8. Gyrolaser according to claim 1, wherein the first optical element and the second polarization separation optical element are uniaxial birefringent retardation plates with flat, parallel sides, the optical axis being tilted approximately 45 degrees relative to the plane of the sides.

9. System to measure the angular speeds or relative angular positions along three different axes, comprising three gyrolasers according to claim 8, oriented in different directions and mounted on a common mechanical structure.

10. Gyrolaser according to claim 1, wherein the slaving device comprises at least a fifth optical assembly made up of a third nonreciprocal optical rotator and of a second optical element, the said optical element being either a reciprocal optical rotator, or a birefringent element, with at least one of the effects or the birefringence being adjustable and adjusted independently of the first optical assembly; the first propagation mode and the third propagation mode passing through the first nonreciprocal optical rotator and the first optical element, the third propagation mode and the fourth propagation mode passing through the third nonreciprocal optical rotator and the second optical element.

11. System to measure the angular speeds or relative angular positions along three different axes, comprising three gyrolasers according to claim 10, oriented in different directions and mounted on a common mechanical structure.

12. Gyrolaser according to claim 1, wherein the cavity comprises an optical standard type Fabry-Perot.

13. System to measure the angular speeds or relative angular positions along three different axes, comprising three gyrolasers according to claim 12, oriented in different directions and mounted on a common mechanical structure.

14. System to measure the angular speeds or relative angular positions along three different axes, comprising three gyrolasers according to claim 1, oriented in different directions and mounted on a common mechanical structure.

* * * * *